June 29, 1926.
R. W. BURNETT
PRESSURE RETAINING VALVE HOLDER AND PIPE ANCHOR
Filed Dec. 6, 1923 2 Sheets-Sheet 1
1,590,733
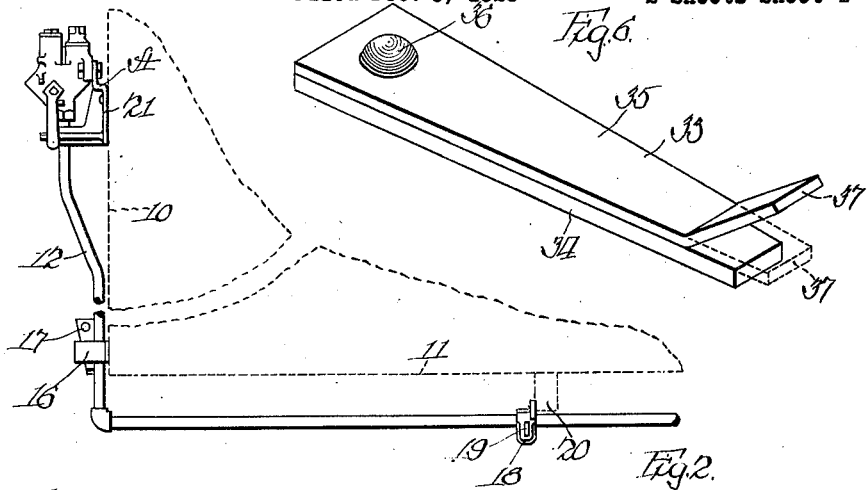
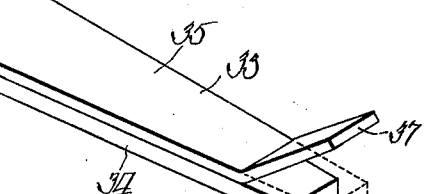
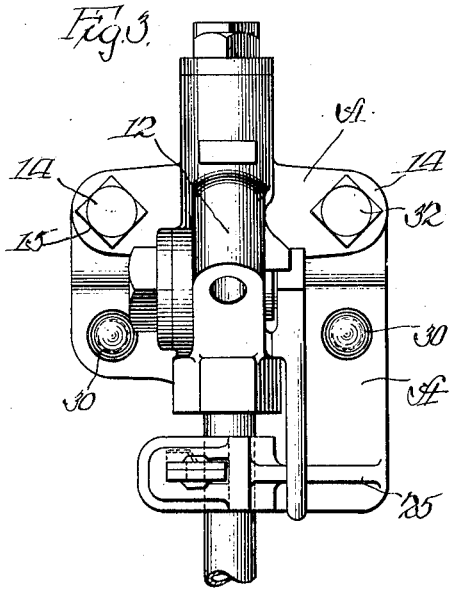
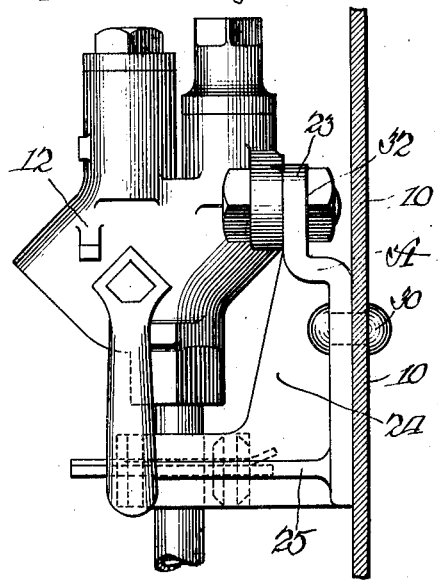
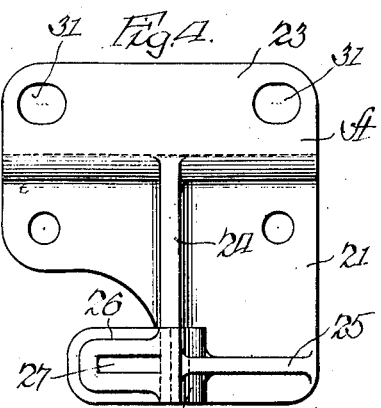
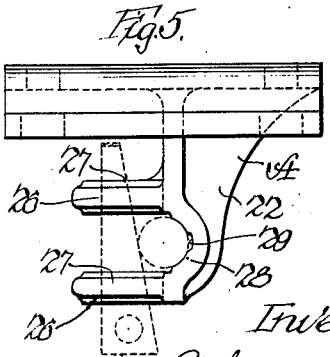

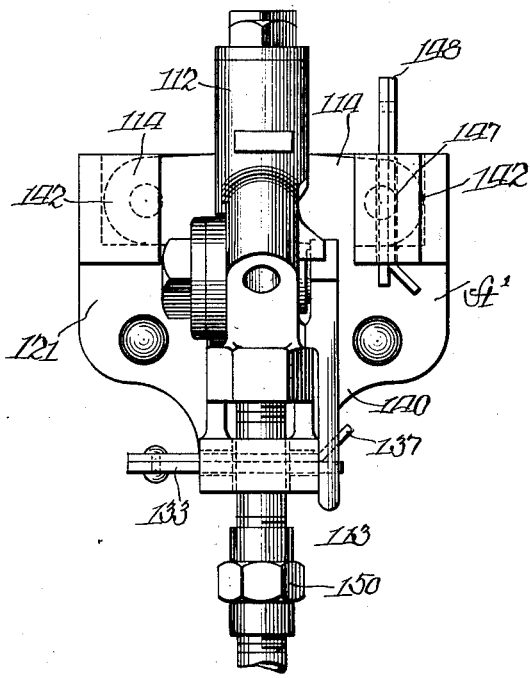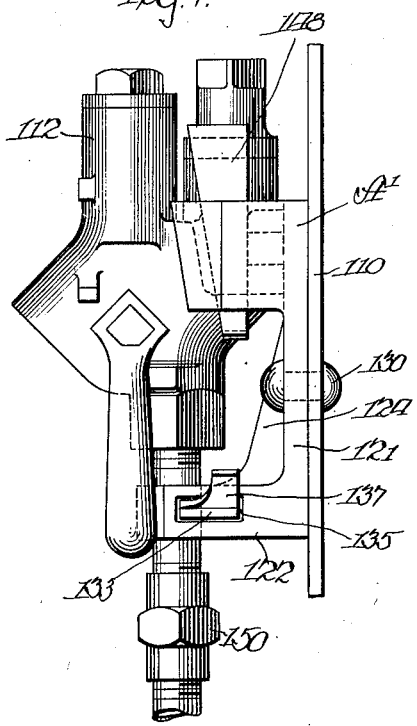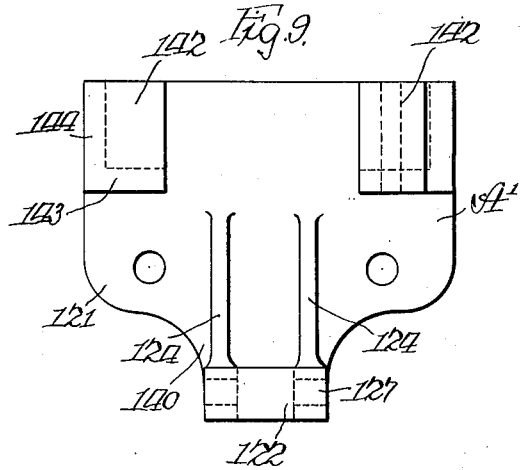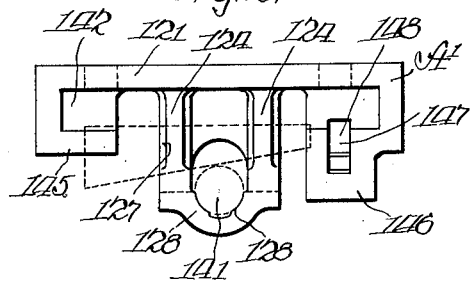

Patented June 29, 1926.

1,590,733

UNITED STATES PATENT OFFICE.

RICHARD W. BURNETT, OF CHICAGO, ILLINOIS.

PRESSURE-RETAINING VALVE HOLDER AND PIPE ANCHOR.

Application filed December 6, 1923. Serial No. 679,048.

This invention relates to improvements in pressure retaining valve holders and pipe anchors.

One object of the invention is to provide means of simple construction for holding and supporting the pressure retaining valve of an air brake system and anchoring the train pipe, which will be efficient in operation and which may be manufactured and applied at very small expense.

Another object of the invention is to provide a support and anchoring means of the character indicated, which is especially adapted for railway cars and which may be permanently fixed thereto, wherein means is provided for quickly attaching the pressure retaining valve and attached pipe.

Other objects and advantages of the invention will more clearly appear from the description and claims hereinafter following.

In the drawings forming a part of this specification, Figure 1 is a side elevational view of a pressure retaining valve and train pipe communicating therewith, showing my improvements in connection therewith, the end portion of the car to which the same are attached being shown in dotted lines, and the parts being broken away to better accommodate the view to the sheet of the drawing. Figure 2 is an enlarged, detailed, side elevational view of my improved pressure retaining valve holder and pipe anchor, showing the pressure retaining valve in position, and the car wall in vertical section. Figure 3 is an end elevational view looking from the left in Figure 2. Figure 4 is a view similar to Figure 3, the pressure retaining valve being omitted. Figure 5 is a top plan view of the construction illustrated in Figure 4. Figure 6 is a detailed, perspective view of a key used in connection with my improvements. And Figures 7, 8, 9 and 10 are views similar to Figures 2, 3, 4 and 5 respectively, illustrating a different embodiment of the invention.

In said drawings, referring first to the construction illustrated in Figures 1 to 6 inclusive, 10 denotes the end wall and 11 the bottom wall of a freight car. The pressure retaining valve proper is indicated at 12, the same being attached to the usual pipe 13 communicating with the exhaust of the triple valve, not shown, of the air brake system. The pressure retaining valve 12 which is of well known construction, includes a body casting having integral securing ears 14 on the opposite sides thereof, each of the ears being provided with the usual opening 15 adapted to receive a securing bolt. The pipe 13 communicates with the lower end of the valve 12 and extends downwardly therefrom along the end wall and thence longitudinally of the car along the bottom wall thereof, the lower portion of the section of the pipe extending along the end wall of the car being inwardly offset and clamped in a bracket 16 secured to the end wall 10, a novel wedge key 17 coacting with the bracket to clamp the pipe. The horizontally extending portion of the pipe is supported within a bracket 18 to which it is clamped by a wedge key 19, the bracket in turn being secured to any suitable support 20 at the bottom of the car.

My improved pressure retaining valve holder and pipe clamp, as shown, in Figures 1 to 5 inclusive, is in the form of a metal bracket designated generally by the reference character A. The bracket A includes a vertically disposed plate 21 secured to the end wall 10 of the car. The plate 21 is cut away at the lower left hand corner as seen in Figures 3 and 4, being otherwise of generally rectangular outline and having an outwardly extending, horizontally disposed, central arm 22 at its lower end, formed integral therewith. The upper end of the plate 21 is outwardly offset providing a vertically disposed flange 23 lying in a plane parallel to the main body portion of the plate. The arm 22 is braced by vertically and horizontally disposed ribs 24 and 25, both formed integral with the plate proper, the rib 24 extending from the arm to the offset portion of the plate and the rib 25 extending from the arm to the right hand edge of the plate, as seen in Figures 3, 4 and 5.

Laterally projecting from the arm 22 on the side thereof opposite to the rib 25, are a pair of parallel, horizontally disposed fingers 26, one of the fingers being at the free end of the arm and the other finger disposed inwardly thereof, the fingers being spaced apart a sufficient distance to admit the pipe 13 therebetween. The fingers 26 are preferably disposed parallel to the plate 21 and are provided with horizontally alined, transverse slots 27, for a purpose hereinafter described. Between the inner ends of the fingers 26, the arm 22 is cut away to provide a curved abutment wall 28, the curved wall being preferably notched centrally and at the opposite ends as indicated at 29—29, to provide a pair of bearing seats for the pipe 13.

The bracket A is preferably secured to the end wall of the car by a pair of rivets 30 extending through the main body portion of the plate and the car wall 10, the openings in the plate 21 through which the rivets extend being preferably so spaced that they will register with the openings ordinarily provided in the end wall of the car for receiving the usual bolts for securing the standard pressure retaining valve in place.

The flange 23 of the plate A is provided with a pair of openings 31 with which the openings 15 of the ears 14 of the pressure retaining valve are adapted to register, the openings 15 and 31 being adapted to receive bolts 32 by which the pressure retaining valve is secured to the bracket A. The openings 31 are preferably elongated horizontally, as shown, to compensate for inaccuracies in the spacing of the openings of the ears 14, and to permit lateral adjustment of the valve, with the pipe 13 to effect proper alinement of the same, thereby preventing undue strain being being placed on the joint between the pipe and valve.

When the valve is secured in position on the bracket, the pipe 13 is disposed between the fingers 26, the same being preferably clamped against the seats on the wall 28 of the arm 22 by a wedge-shaped key 33, which is adapted to be driven into the slots 27 of the arms. The key 33 preferably has one of its longitudinal edges disposed at right angles to the end edges thereof and the other longitudinal edge inclined thereto. The key 33 consists of a pair of sections 34 and 35 of sheet metal plates of mild steel, secured together at the wide end of the key by a rivet 36. The plate 35 is appreciably thinner than the plate 34 and is of greater length so as to extend beyond the outer end of the plate 34 as indicated at 37, and shown in dotted lines in Figure 6. The end 37 is adapted to be bent laterally, as shown in the full lines in Figure 6, to retain the key in position after the same has been driven into the slots 27. The other thicker and shorter plate 34 has its smaller end or tang left blunt so as to facilitate removal of the key by simply using a hammer or other suitable tool to hit against the said blunt end.

Referring next to the construction illustrated in Figures 7, 8, 9 and 10, 110 denotes the end wall of a freight car. The pressure retaining valve proper is indicated at 112, the same being attached to the pipe 113 communicating with the exhaust of the triple valve of the air brake system. The pressure retaining valve includes a body casting having securing ears 114 formed integral therewith.

The improved pressure retaining valve holder and pipe clamp shown in Figures 7 to 10 inclusive comprises a metal bracket designated generally by the reference character A'. The bracket A' is secured to the end wall 110 of the car by rivets 130 in a manner similar to the bracket A hereinbefore described. The bracket A' comprises a vertically disposed plate 121 cut away at its lower end at the opposite sides to provide a downward extension 140. The main body portion of the plate 121 is of generally rectangular outline and the extension 140 has an outwardly extending horizontal arm 122 adjacent the lower end thereof, formed integral therewith. The arm 122 is provided with a vertically disposed opening 141 adapted to receive the pipe 113, the opening being preferably elongated in a direction at right angles to the plate 121 as clearly shown in Figure 10. The arm 122 is also provided with a transverse, horizontally disposed slot 127 intersecting the opening 141 at the inner end thereof. The wall at the outer end of the opening 141 is provided with a pair of curved seats 128—128 adapted to form abutments for the outer side of the pipe 113. When the valve is in position on the bracket, the pipe 113 is disposed within the opening 141, the same being preferably clamped against the seats 128 by a wedge shaped key 133 similar to the key 33 hereinbefore described, with the exception that the projecting end portion 137 of the plate 135 thereof is cut away at its outer end as clearly shown in Figure 7. The arm 122 is braced by a pair of vertically extending ribs 124 disposed on each side of the opening 141 and formed integral with the plate.

At the upper end of the plate, a pair of spaced sockets 142—142, each open at the top and inner side, are provided. Each of the sockets 142 has a bottom wall 143 extending at right angles to the plate, a vertical side wall 144 outwardly projecting from the adjacent vertical edge of the plate, and a front wall 145 disposed parallel to the body portion of the plate, the main portion of the plate 121 forming the rear wall of each socket. The sockets 142—142 are adapted to receive, respectively, the projecting ears 114—114 of the pressure retaining valve. The socket at the right hand side of the plate 121, as seen in Figures 8, 9 and 10, has the front wall thereof provided with a solid outward projection 146, which is vertically slotted as indicated at 147 to receive a key 148, which, as shown, is in all respects similar to the key 33 illustrated in Figure 6. The outer wall of the slot 147 is inclined to correspond with the inclined edge of the key, so that the opposite longitudinal edge of the key will be vertically disposed when the same is driven into the slot. The bottom wall of the socket is provided with an opening in alinement with the slot 147 to accommodate the lower end portion of the key. When the valve is in position with the lugs 114 thereof seated within the sockets 142, the lug at the right hand side as seen in Figures 8, 9 and 10, is clamped against the rear wall of the corresponding socket by the wedge key 148 driven into the slot 147. The keys 133 and 148 are retained in position in a manner similar to the key 33, i. e. by bending the thin plate section thereof laterally after insertion of the respective key. It will be evident that, as only one of the ears 114 of the pressure retaining valve is clamped by the key 148, the parts may adjust themselves so as to compensate for irregularities in the rear surface of the casting forming the body of the pressure retaining valve, in other words, the same may rock slightly on the plate 121. By clamping the retaining valve by one ear only, all danger of cracking the casting or breaking off of the ears is avoided, as the valve casting is tightly clamped without subjecting it to undue bending strains as may be the case when both ears are bolted down and irregularities exist in either or both of the abutting surfaces of the casting and the part to which it is clamped.

From the preceding description taken in connection with the drawings, it will be seen that my improvements do not require any change or modification of the standard retaining valve and consequently my improvements are quickly adaptable for use on cars now in service and on new cars. The present practice is to employ a coupling in the pipe line from the triple valve to the retaining valve which is located beneath the car and where this arrangement is employed, the form of my improvements shown in Figures 1 to 5 of the drawings is especially adapted, since, by removing the bolts that hold the retaining valve and the key which holds the pipe, the valve and the pipe can be swung out sufficiently from the wall of the car to permit unscrewing of the valve from the pipe. In the form of my invention shown in Figures 8 to 10 inclusive, I contemplate employing a union in the pipe line indicated at 150 in Figure 8, that is, immediately beneath my improved anchoring bracket and with this arrangement, by simply unscrewing the coupling and after removal of the wedge keys 133 and 148, the retaining valve with the nipple section of the pipe can be lifted upwardly, which eliminates the labor which would otherwise be required in disconnecting the pipe line back to the union usually employed underneath the car.

Another important feature of my invention resides in the fact that the retaining valve can be disconnected without obtaining access to the interior of the car. With the present practice, where the retaining valve is bolted directly through the end wall of the car and it is necessary to repair or replace the valve or the pipe line, it is necessary to go to the interior of the car and this frequently involves heavy expense in the event the car happens to be loaded at the time repairs are required. With my improvements, it is immaterial whether the car is loaded or unloaded, since repairs or adjustments can be made to the retaining valve without going to the interior of the car. Furthermore, with the practice heretofore employed, breakage of the pipe leading to the valve (which pipe is usually of ⅜ inch size) is very common due to the fact that the retaining valve is rigidly applied to the car wall, whereas the pipe is free to vibrate more or less and fractures occur at the threaded section of the pipe. With my construction, both the pipe itself and the retaining valve are rigidly clamped to the same bracket to thereby avoid possibility of independent movement of these two elements and thus eliminate danger of fracture. In this connection, it may be added that it is not feasible with the present practice to rigidly clamp the pipe to the car wall at any point due to the frequent bulging of the car wall, which would cause the pipe to bend to such an extent as to fracture it at its weakened section where threaded to the retaining valve.

I have herein shown and described what I now consider the preferred manner of carrying out my invention but the same is merely illustrative and I contemplate all changes and modifications that come within the scope of the claims appended hereto.

I claim:

1. In a combined pressure retaining valve holder and pipe anchor, the combination with a plate adapted to be secured to a fixed support, said plate having means thereon arranged for accommodation of certain parts of said retaining valve whereby said parts may be clamped to said plate to support said valve; of an arm projecting from the plate, said arm having an opening therethrough to accommodate the passage of the pipe; and means for clamping the pipe within said opening.

2. In a combined holder for a pressure retaining valve having attaching lugs and an attached pipe, a plate adapted to be secured to a fixed support in vertical position, said plate having means at the upper end to which the lugs may be clamped, said plate also having an arm at the lower end provided with an opening to accommodate the passage of a pipe and within which the pipe may be securely clamped.

3. In a device of the character described including a plate like member having sockets thereon adapted to receive the usual securing lugs of a pressure retaining valve, and an arm on said plate, said arm having an opening therethrough to accommodate the passage of a pipe and within which the pipe may be clamped.

4. In a device of the character described, a plate like member having a socket therein adapted to receive the securing lug of a pressure retaining valve, said socket having a flat rear wall against which the lug is adapted to abut and a front wall having a face thereon inclined with reference to the rear wall, whereby a key may be driven against said lug while bearing on said inclined wall to tightly clamp the lug, said plate also having an arm outwardly extending therefrom, said arm being provided with an opening adjacent the free end thereof adapted to accommodate a pipe depending from said valve, said arm being also provided with a transverse slot intersecting the inner side of said opening, whereby a key may be driven into said slot into engagement with the pipe to wedge the same against the opposite side wall of said opening.

5. A combined holder for a retaining valve having a pair of attaching lugs and a pipe extending therefrom, said holder comprising a main body portion provided with a lateral extension, the main body portion of said holder having a pair of spaced sockets thereon adapted to receive the attaching lugs, wedge means insertable within one of said sockets for clamping the corresponding lugs therein, said extension having an opening therethrough adapted to accommodate the pipe, and wedge means for clamping the pipe to said arm within said last named opening.

6. In a clamping and supporting holder for a pressure retaining valve having a pair of retaining lugs thereon, and a connected depending pipe, the combination with a plate like member adapted to be secured to a fixed support in upright position; of a laterally disposed arm formed integral with said member, said arm having an opening therethrough adjacent the outer end thereof adapted to accommodate the depending pipe; an abutment shoulder formed on the wall of said opening at the outer side thereof, said arm being also provided with a horizontally disposed, transverse slot intersecting said opening at the inner side thereof; a wedge key adapted to be driven into said slot into intersecting relation with said opening for wedging the pipe against said abutment shoulder, said key having a lateral bendable tang for retaining the same in position on said arm; a pair of abutment walls overhanging the upper end of said plate, adjacent the side edges thereof, each of said walls being spaced from the main body portion of the plate member to receive said retaining lugs therebetween, one of said abutment walls being vertically slotted on the inner side thereof; and a wedge key adapted to be driven into said slot and project into the space between the wall and plate, whereby the corresponding retaining lug is clamped to the main body portion of the plate, and the other lug is retained behind the remaining abutment wall.

7. In a device of the character described, the combination with a holding bracket proper adapted to be permanently attached to a car end wall; securing means cooperable with said bracket and adapted to cooperate with a standard retaining valve for holding the latter rigid with respect to said bracket; and securing means cooperable with said bracket and adapted to cooperate with the pipe leading to the retaining valve at a point immediately adjacent the latter to rigidly secure the pipe to said bracket whereby independent movement and vibration of the valve and pipe is prevented.

8. In a combined holder for a pressure retaining valve having attaching lugs and an attached pipe, a plate adapted to be secured to a fixed support, said plate having means at one end to which the lugs may be clamped, said plate also having an arm adjacent the other end provided with an opening to accommodate the passage of a pipe and within which the pipe may be securely clamped.

9. In a combined pressure retaining valve holder and pipe anchor, the combination with a bracket proper adapted to be permanently attached to a car wall; securing means cooperable with said bracket and arranged to cooperate with parts of a standard retaining valve for holding the latter rigid with respect to said bracket; securing means rigidly associated with said bracket and adapted to cooperate with the pipe leading to the retaining valve at a point spaced from said securing means to rigidly secure the pipe to said bracket whereby independent movement and vibration of the valve and pipe is prevented, said latter securing means including an adjustable clamping means.

10. In a combined pressure retaining valve holder and pipe anchor, the combination with a plate having integral means thereon arranged for accommodation of parts of said retaining valve and to which said parts may be rigidly clamped; and additional securing means on said plate spaced from said first means and formed integrally therewith, said means including elements which provide an opening for the reception of said pipe; and means for rigidly clamping the pipe within said opening.

In witness that I claim the foregoing I have hereunto subscribed my name this 28th day of November, 1923.

RICHARD W. BURNETT.